US009280989B2

(12) United States Patent
Pitcher et al.

(10) Patent No.: US 9,280,989 B2
(45) Date of Patent: Mar. 8, 2016

(54) MAGNETIC DEVICES INCLUDING NEAR FIELD TRANSDUCER

(71) Applicant: SEAGATE TECHNOLOGY LLC, Cupertino, CA (US)

(72) Inventors: Philip G. Pitcher, Shakopee, MN (US); Sami C. Antrazi, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/923,922

(22) Filed: Jun. 21, 2013

(65) Prior Publication Data

US 2014/0376339 A1    Dec. 25, 2014

(51) Int. Cl.
*G11B 13/08* (2006.01)
*G11B 5/31* (2006.01)
*G11B 5/00* (2006.01)

(52) U.S. Cl.
CPC .............. *G11B 5/314* (2013.01); *G11B 5/3133* (2013.01); *G11B 2005/0021* (2013.01)

(58) Field of Classification Search
CPC .... G11B 5/4866; G11B 5/313; G11B 5/3133; G11B 5/3153; G11B 5/70668; G11B 5/60; G11B 5/6082
USPC .................. 360/59, 114.02; 369/13.02, 13.17, 369/13.24, 13.32, 13.33
See application file for complete search history.

(56) References Cited

U.S. PATENT DOCUMENTS

| 4,492,873 A | 1/1985 | Dmitriev |
| 5,374,318 A | 12/1994 | Rabalais |
| 5,379,712 A | 1/1995 | Armini |
| 5,482,611 A | 1/1996 | Helmer |
| 5,849,093 A | 12/1998 | Andra |
| 5,945,681 A | 8/1999 | Tokiguchi |
| 6,130,436 A | 10/2000 | Renau |
| 6,589,676 B1 | 7/2003 | Gui |
| 6,632,483 B1 | 10/2003 | Callegari |
| 6,641,932 B1 | 11/2003 | Xu |
| 6,683,426 B1 | 1/2004 | Kleeven |
| 6,839,191 B2 | 1/2005 | Sugiura |
| 6,861,642 B2 | 3/2005 | Ichiki |
| 7,018,729 B2 | 3/2006 | Pocker |

(Continued)

FOREIGN PATENT DOCUMENTS

| EP | 0240088 | 10/1987 |
| EP | 499357 B1 | 8/1992 |

(Continued)

OTHER PUBLICATIONS

Liu et al., "Influence of the Incident Angle of Energetic Carbon Ions on the Properties of Tetrahedral Amorphous Carbon (ta-C) films", *Journal of Vacuum Science and Technology*, vol. 21, No. 5, Jul. 25, 2003, pp. 1665-1670.

(Continued)

*Primary Examiner* — Thomas Alunkal

(74) *Attorney, Agent, or Firm* — Mueting, Raasch & Gebhardt, P.A.

(57) ABSTRACT

An apparatus having at least an air bearing surface (ABS), the apparatus including a near field transducer (NFT) positioned adjacent the ABS of the apparatus, wherein the NFT includes a plasmonic material; and not greater than about 200 ppm of one or more microalloy dopants.

22 Claims, 1 Drawing Sheet

(56) References Cited

U.S. PATENT DOCUMENTS

| | | | |
|---|---|---|---|
| 7,377,228 B2 | 5/2008 | Mack | |
| 7,476,855 B2 | 1/2009 | Huang | |
| 8,077,559 B1 | 12/2011 | Miyauchi | |
| 8,325,567 B2 | 12/2012 | Miyauchi | |
| 8,351,151 B2* | 1/2013 | Katine | G11B 5/314 360/110 |
| 8,351,307 B1 | 1/2013 | Wolf | |
| 8,455,060 B2 | 6/2013 | Tabat | |
| 2003/0054133 A1 | 3/2003 | Wadley | |
| 2004/0146685 A1 | 7/2004 | Ma | |
| 2005/0012052 A1 | 1/2005 | Platzgummer | |
| 2006/0049348 A1 | 3/2006 | Petrov | |
| 2006/0208202 A1 | 9/2006 | Gupta | |
| 2006/0238133 A1 | 10/2006 | Horsky | |
| 2008/0067442 A1 | 3/2008 | Vanderberg | |
| 2008/0230724 A1 | 9/2008 | Low | |
| 2008/0305598 A1 | 12/2008 | Horsky | |
| 2009/0189096 A1 | 7/2009 | Chen | |
| 2010/0061199 A1 | 3/2010 | Hirara | |
| 2010/0123965 A1* | 5/2010 | Lee | G11B 5/314 360/59 |
| 2010/0123967 A1* | 5/2010 | Batra | G11B 5/1278 360/59 |
| 2010/0190036 A1 | 7/2010 | Komvopoulos | |
| 2010/0209627 A1 | 8/2010 | Tabat | |
| 2010/0320403 A1 | 12/2010 | Amaldi | |
| 2011/0006214 A1 | 1/2011 | Bonig | |
| 2011/0026161 A1 | 2/2011 | Ikeda | |
| 2011/0205863 A1* | 8/2011 | Zhao | B82Y 10/00 369/13.33 |
| 2011/0294398 A1 | 12/2011 | Hu | |
| 2011/0317528 A1 | 12/2011 | Miyauchi | |
| 2012/0045662 A1 | 2/2012 | Zou | |
| 2013/0107679 A1* | 5/2013 | Huang | G11B 13/08 369/13.32 |
| 2013/0200280 A1 | 8/2013 | Pitcher | |
| 2013/0202809 A1 | 8/2013 | Pitcher | |
| 2014/0043948 A1* | 2/2014 | Hirata | G11B 5/314 369/13.24 |
| 2014/0272179 A1 | 9/2014 | Radovanov | |
| 2015/0064365 A1 | 3/2015 | Pitcher | |

FOREIGN PATENT DOCUMENTS

| | | |
|---|---|---|
| EP | 0942072 | 9/1999 |
| EP | 1328027 | 7/2003 |
| EP | 2106678 | 10/2008 |
| JP | 2008-077756 | 4/2008 |
| WO | WO 97/45834 | 12/1997 |

OTHER PUBLICATIONS

PCT/US2013/024274 Search Report and Written Opinion dated Apr. 2, 2013.
U.S. Appl. No. 13/440,068, filed Apr. 5, 2012, Pitcher.
U.S. Appl. No. 13/440,071, filed Apr. 5, 2012, Pitcher.
U.S. Appl. No. 13/440,073, filed Apr. 5, 2012, Pitcher.
U.S. Appl. No. 13/798,469, filed Mar. 13, 2013, Pitcher.
Piazza et al., "Large Area Deposition of Hydrogenated Amorphous Carbon Films for Optical Storage Disks", Diamond and Related Materials, vol. 13, No. 4-8, Apr. 2004, pp. 1505-1510.
Druz et al., "Diamond-Like Carbon Films Deposited Using a Broad, Uniform Ion Beam from an RF Inductively Coupled CH4-Plasma Source", Diamond and Related Materials, vol. 7, No. 7, Jul. 1998, pp. 965-972.
PCT/US2013/024273 Search Report and Written Opinion dated Apr. 2, 2013.
Al-Bayati et al., Junction Profiles of Sub keV Ion Implantation for Deep Sub-Quarter Micron Devices, *IEEE*, 2000, pp. 87-90.
Angel et al., "Enhanced Low Energy Drift-Mode Beam Currents in a High Current Ion Implanter," *IEEE*, 1999, pp. 219-222.
Robertson, J., "Diamond-Like Amorphous Carbon," *Materials Science and Engineering R 37*, 2002, pp. 129-281.
PCT/US2013/030659 Search Report and Written Opinion dated Jun. 17, 2013.
Zengliang, "Introduction to Ion Beam Biotechnology," 2008, 6 pages.
Notification Concerning Transmittal of International Preliminary Examination Report for PCT/US2013/024269 dated Aug. 14, 2014, 6 pages.
Lifshitz et al., "Supplementation Model for Film Growth from Hyper Thermal Species," *Physical Review B*, vol. 41, No. 15, May 15, 1990, pp. 10 468-10 480.
Webster's Nine New Collegiate Dictionary, Merriam-Webster incorporated, publishers; Springfield, Massachusetts, USA, 1990 (no month), excerpt p. 829.

* cited by examiner

MAGNETIC DEVICES INCLUDING NEAR FIELD TRANSDUCER

BACKGROUND

Emerging leading edge storage technologies such as heat assisted magnetic recording (HAMR), exert additional requirements for the components. Management of the interface between the underlying transducer structure and overcoat system can be of great importance due to the more demanding, higher temperatures experienced and the requirements of new plasmonic materials systems in the transducer structure. Oft utilized materials choices, as used in contemporary perpendicular storage transducer technology, may not be able to accommodate the increased requirements of HAMR and may have limited extendibility in perpendicular data storage.

SUMMARY

An apparatus having at least an air bearing surface (ABS), the apparatus including a near field transducer (NFT) positioned adjacent the ABS of the apparatus, wherein the NFT includes a plasmonic material; and not greater than about 200 ppm of one or more microalloy dopants.

An apparatus having at least an air bearing surface (ABS), the apparatus including: a near field transducer (NFT) positioned adjacent the ABS of the apparatus, wherein the NFT includes a plasmonic material; and not greater than about 200 ppm of one or more microalloy dopants; and a microalloy dopant layer including one or more of the microalloy dopants, wherein the microalloy dopant layer is positioned directly adjacent the NFT.

A method of fabricating a device, the method including forming a near field transducer (NFT), the NFT including gold or an alloy thereof; forming a microalloy dopant layer directly adjacent one surface of the NFT, the microalloy dopant layer including one or more rare earth elements, one or more alkaline earth metals, one or more alkali metals, or combinations thereof; applying energy to at least the microalloy dopant layer thereby allowing at least a portion of the microalloy dopant material to diffuse into the NFT.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Figure 1:
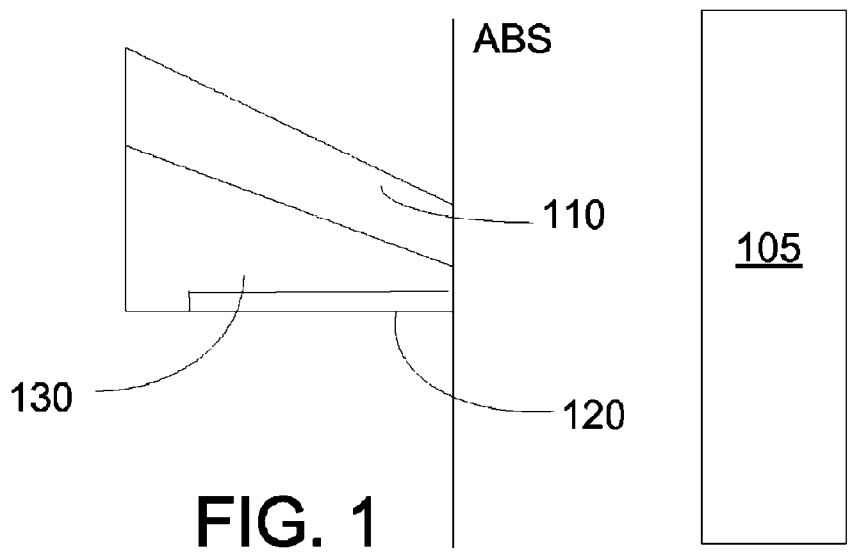
FIG. 1 is a schematic depiction of a portion of a magnetic device.

Disclosed herein are apparatuses and devices that include optical transducers, for example. FIG. 1 shows a disclosed apparatus. Such an apparatus includes a near field transducer (NFT) 120. The apparatus or device depicted in FIG. 1 is only an example of one way in which the NFT can be configured within a larger device, and should not be taken as limiting this disclosure in any way. This exemplary device includes (among other components not depicted in FIG. 1) a NFT 120 and a first magnetic pole 110. An optional heat sink 130 can be positioned between the first magnetic pole 110 and the NFT 120. In some embodiments, the NFT 120 can be a peg/disc type of NFT, which can also be referred to as a lollipop structure, a nanorod type of NFT which can also be referred to as a gap type of NFT, or a funnel-type NFT for example. In some embodiments, the NFT can be a peg/disc type of NFT.

The NFT acts to condense light rays (from an energy source (not depicted)) to a location on the magnetic media disc 105. The NFT 120 can be described as having an air bearing surface or being at the air bearing surface (ABS) of the device. The ABS is adjacent the magnetic media disc 105. A device such as that depicted in FIG. 1 could be utilized for heat assisted magnetic recording (HAMR).

An important problem in HAMR transducer technology is recession of the NFT from the ABS. This can occur upon exposure to the elevated temperatures experienced during transducer operation (typically 200° C. to 450° C.). Several mechanisms of mass transfer may be operative in this phenomenon. These may include those known in metallurgy to be responsible for grain boundary migration or grain growth. Other phenomena which may be driving thermomechanical distortion of the NFT may result from the size (i.e., nanoscale) of the NFT component in HAMR.

A specific example of such other phenomena is the effect of surface stress. Surface stress links the bonding configuration at an interfacial region with macroscopic characteristics and is known to be operative in many surface phenomena, e.g. surface reconstruction. Surface stress originates from the redistribution of charge density due to the different co-ordination of surface atoms to those in the bulk of the material. As such, the nature of the chemical bonding and the equilibrium interatomic distances at the surface are different from that inside the bulk. Surface atoms experience less attractive interaction forces from their surroundings than do atoms in the bulk. As a consequence, surface atoms experience a net force towards the inside of the bulk resulting in a surface stress. For mechanical equilibrium, surface stresses must be balanced by corresponding bulk stresses. In nanoscale objects, surface induced bulk stresses may even exceed the theoretical yield stress of the material. Such large forces may drive surface, bulk and grain boundary vacancy migration that could produce creep effects possibly resulting in volumetric distortion (or recession) of the NFT transducer.

To mitigate NFT recession it may be desired to suppress or reduce the atom and/or defect mobility or diffusion of certain components of the NFT structure (e.g., gold atoms/vacancies of an NFT structure). Reducing or suppressing surface, interfacial, or bulk mobility of atoms or defects (e.g. point defects such as vacancies or interstitials or line defects such as dislocations); reducing or suppressing the grain boundary migration velocity; altering the interfacial surface free energy; or combination thereof, to act to reduce or suppress NFT recession or protrusion may be characteristics desired in a system including disclosed NFTs.

In previous disclosures, NFTs were generally made of a plasmonic material. Exemplary plasmonic materials can include, for example gold (Au), silver (Ag), copper (Cu), aluminum (Al), or alloys thereof. Exemplary plasmonic materials can also include indium tin oxide (ITO), aluminum zinc oxide (AZO), gallium zinc oxide (GZO), or titanium nitride (TiN), for example. Exemplary alloys of Au, Ag, Cu, and Al can include, for example Au alloyed with cadmium (Cd), or zinc (Zn). In some previously utilized embodiments, the NFT could be made of, or include gold (Au), silver (Ag), or alloys thereof.

Suppression or reduction of NFT recession or protrusion may be accomplished through the combination of control of atom and/or defect mobility through both interfacial mechanisms as well as other effects. One such other effect that may be utilized is referred to herein as "microalloying". As such, a disclosed NFT can be referred to herein as a microalloyed NFT. Such an effect can be described as a "bulk" effect as opposed to an interface effect. Reduction or suppression of the grain boundary migration velocity of certain materials, for example, may be achieved by microalloying. As used herein, microalloying impurity (or dopant) concentrations refer to impurity (or dopant) additions of not greater than 200 ppm (0.02%); and in some embodiments not greater than 100 ppm (0.01%). These microalloying impurity amounts refer to the amount of the microalloying dopant in the material whose recession or protrusion is desired to be suppressed or reduced. For example therefore, these microalloying impurity amounts refer to the amount of the microalloying dopant in the NFT material.

Microalloying may be beneficial because the extremely low concentrations of dopant elements should have little degrading effect on the plasmonic performance of the NFT material. In contrast, previous alloys utilized components at levels of at least 0.5% in the NFT material and in some instances from 0.5% to 5% in the NFT material.

In some embodiments, where the plasmonic material of the NFT (i.e., the underlying structure or the underlying transducer structure) comprises gold (Au) or a gold alloy; microalloying dopants can include, for example rare earth elements, alkaline earth metals, or alkali metals. Specific examples of such dopants can include, for example, beryllium (Be), calcium (Ca), lithium (Li), magnesium (Mg), strontium (Sr), sodium (Na), potassium (K), cerium (Ce), lanthanum (La), neodymium (Nd), and gadolinium (Gd). In some embodiments, dopants can include, for example beryllium (Be), calcium (Ca), lithium (Li), magnesium (Mg), or combinations thereof.

The effects of microalloying have also been shown to be isochronous with recrystallization effects in NFT materials such as gold. The recrystallization temperature of gold (and therefore kinetics) increases from about 112° C. for 99.999% pure gold to about 160° C. for 99.99% gold to greater than 200° C. for 99.9% gold. Therefore microalloying effects may readily be induced at expected NFT temperatures or be induced through relatively low temperature benign processing. The low concentrations utilized herein also aid the viability of a low temperature, short duration, low intrusive processing technique, (e.g. low temperature thermal diffusion), to suppress grain boundary migration or NFT recession or protrusion effects.

In some embodiments where the plasmonic material of the NFT (i.e., the underlying structure or the underlying transducer structure) comprises something other than gold, other microalloying dopants could be utilized. For example, in some embodiments in which a NFT may be made of silver (Ag) or a silver alloy, exemplary microalloying dopants could include, for example manganese (Mn) and zinc (Zn).

A microalloyed NFT can be fabricated using various techniques. In some embodiments, a microalloyed NFT may be fabricated using deposition methods and one or more targets that include microalloying dopants (along with the plasmonic material(s)). For example, a target that includes one or more plasmonic materials and one or more microalloying dopants could be utilized in vapor deposition processes, sputter deposition processes, or other processes. It should be noted that in such a target, the microalloying dopants may have concentrations that are the same as or higher than those desired in the final microalloyed NFT. Alternatively, such methods (deposition methods) could be used with more than one target, i.e., one target of a plasmonic material(s) and another target of a microalloying dopant(s). For example, suitably doped sputtering targets, evaporator charges, or ion implantation, for example could all be utilized to produce a microalloyed NFT.

Figure 2:
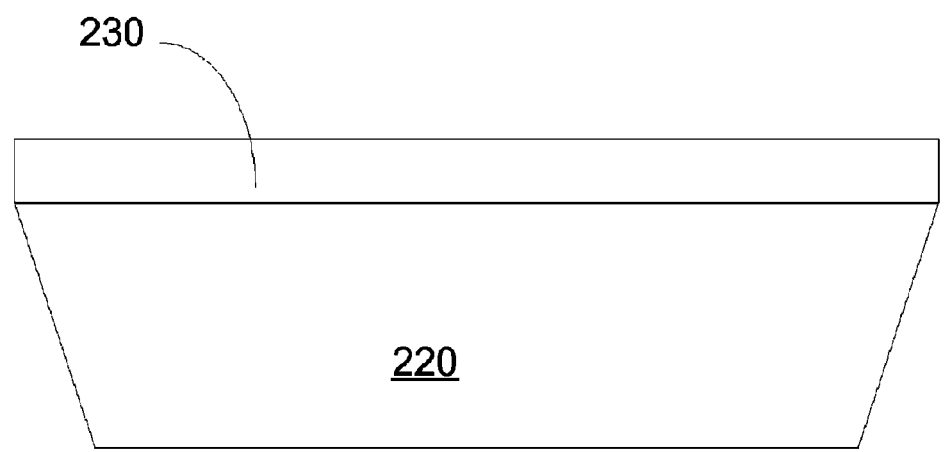
FIG. 2 is a schematic depiction of a portion of an exemplary disclosed near field transducer and an adjacent microalloy dopant layer.

Another method of producing a microalloyed NFT is to form a layer of the microalloying dopant over the NFT and allow (or force) the microalloying dopant to diffuse into the NFT. Such a layer could also include the microalloying dopant in combination with some other material, for example a metal. A structure including a NFT and a microalloy dopant layer (that can include other non-microalloy dopant materials) is depicted in FIG. 2. This device includes a NFT 220 and a microalloy dopant layer 230. The microalloy dopant layer 230 can be directly adjacent to the NFT 220, can cover the entirety of the NFT surface, can cover more than the entire surface of the NFT 220, or can cover less than the entire surface of the NFT 220. This method can be accomplished through the application of specific heat or energy to diffuse the dopants (for example through a furnace, by laser, or by e-beam for example), by utilizing the natural thermal heating produced during operation of the NFT when the device is in use, or both. Microalloyed NFTs created in this way may or may not have a constant microalloy dopant concentration across the entire NFT. In some embodiments, a microalloyed NFT created in this way may have a higher concentration of microalloying dopant at the interface with the microalloying dopant layer. Such devices may also include a layer of the microalloyed dopant material of the NFT, as not all of the microalloy dopant material will diffuse into the NFT. Such a device could have a structure similar to that depicted in FIG. 2.

Disclosed devices can also include a NFT and a microalloy dopant layer that includes non-microalloy dopant materials as well as microalloy dopant materials. A microalloy dopant layer can include one or more microalloy dopants (such as those disclosed above) and one or more non-microalloy dopant materials. In some embodiments, the non-microalloy dopant material can include metals, for example, a microalloy dopant layer could include one or more microalloy dopants and copper (Cu) for example. In some embodiments (where an associated NFT is made of gold or a gold alloy), a microalloy dopant layer could include beryllium (Be) and copper (Cu). A microalloy dopant layer that includes copper, for example, could be advantageous because copper forms a relatively strong bond with gold (an exemplary material of the NFT), thereby providing a layer over the NFT that would be strongly bonded to the NFT.

In some embodiments, a microalloy dopant layer that includes both microalloy dopant materials and non-microalloy dopant materials can have concentrations of the microalloy dopant materials that are at a level that is sufficient to obtain desired levels of the microalloy dopant material in the NFT material. In some embodiments, a microalloy dopant layer that includes both microalloy dopant materials and non-microalloy dopant materials can have concentrations of the microalloy dopant materials that are at a level that is sufficient to obtain not greater than 200 ppm in the NFT, for example. In some embodiments, a microalloy dopant layer that includes both microalloy dopant materials and non-microalloy dopant materials can have concentrations of the microalloy dopant materials that are at a level that is sufficient to obtain not greater than 100 ppm in the NFT, for example. In some embodiments, a microalloy dopant layer that includes both microalloy dopant materials and non-microalloy dopant materials can have concentrations of the microalloy dopant materials that can be 1% or less, for example. In some embodiments, a microalloy dopant layer that includes both microalloy dopant materials and non-microalloy dopant materials can have concentrations of the microalloy dopant materials that can be 0.5% or less, for example.

In embodiments where a microalloying dopant layer is formed over the NFT, the microalloying dopant layer (which can include only a microalloy dopant material or a microalloy dopant material and a non-microalloy dopant material) can have a thickness of not greater than 50 Å; in some embodiments not greater than 30 Å; in some embodiments from a partial monolayer of the microalloy dopant layer material to not greater than 10 Å; and in some embodiments from a partial monolayer of the microalloy dopant layer material to not greater than 5 Å. Microalloy dopant layers can be formed using known methods, including for example those disclosed in commonly assigned U.S. patent application Ser. Nos. 13/440,071, 13/440,068, and 13/440,073; the disclosures of which are incorporated herein by reference thereto to the extent that they do not contradict this disclosure. A microalloy dopant layer that includes a non-microalloy dopant material as well as a microalloy dopant material can be fabricated using various techniques. In some embodiments, the microalloy dopant layer may be fabricated using deposition methods and one or more targets that include microalloying dopant materials and the non-microalloy dopant materials. For example, a target that includes one or more non-microalloy dopant materials and one or more microalloying dopants could be utilized in vapor deposition processes, sputter deposition processes, or other processes. It should be noted that in such a target, the microalloying dopants may have concentrations that are at least the same as or higher than those desired in the final microalloy dopant layer. Alternatively, such methods (deposition methods) could be used with more than one target, i.e., one target of a non-microalloy dopant material(s) and another target of a microalloying dopant(s). For example, suitably doped sputtering targets, evaporator charges, or ion implantation, for example could all be utilized to produce such microalloy dopant layers.

A microalloyed NFT may also be combined with other techniques designed to reduce or suppress the recession of the NFT. Such techniques include film structures such as those described in concurrently filed U.S. patent application Ser. No. 13/923,925, entitled MAGNETIC DEVICES INCLUDING FILM STRUCTURES, filed herewith naming Philip Pitcher and Sami Antrazi; and U.S. patent application Ser. No. 13/798,469, entitled ARTICLES INCLUDING INTERMEDIATE LAYER AND METHODS OF FORMING; the disclosures of which are incorporated herein by reference thereto to the extent that they do not contradict this disclosure.

Thus, embodiments of magnetic devices including near field transducers are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

The invention claimed is:

1. An apparatus having at least an air bearing surface (ABS), the apparatus comprising:
a near field transducer (NFT) positioned adjacent the ABS of the apparatus, wherein the NFT comprises a plasmonic material; and not greater than about 200 ppm of one or more microalloy dopants.

2. The apparatus according to claim 1, wherein the plasmonic material comprises gold or an alloy thereof.

3. The apparatus according to claim 2, wherein the microalloying dopants are selected from: one or more rare earth elements, one or more alkaline earth metals, one or more alkali metals, or combinations thereof.

4. The apparatus according to claim 2, wherein the NFT comprises not greater than about 100 ppm of one or more rare earth elements, one or more alkaline earth metals, one or more alkali metals, or combinations thereof.

5. The apparatus according to claim 2, wherein the microalloy dopant is selected from: beryllium (Be), calcium (Ca), lithium (Li), magnesium (Mg), strontium (Sr), sodium (Na), potassium (K), cerium (Ce), lanthanum (La), neodymium (Nd), gadolinium (Gd), and combinations thereof.

6. The apparatus according to claim 2, wherein the microalloy dopant is selected from: beryllium (Be), calcium (Ca), lithium (Li), magnesium (Mg) and combinations thereof.

7. The apparatus according to claim 1, wherein the plasmonic material is selected from: silver (Ag), copper (Cu), aluminum (Al), and alloys thereof.

8. The apparatus according to claim 1, wherein the NFT is a peg/disc type NFT, a nanorod type NFT, or a funnel-type NFT.

9. The apparatus according to claim 1 further comprising a microalloy dopant layer comprising one or more of the microalloy dopants, the microalloy dopant layer positioned directly adjacent the NFT.

10. An apparatus having at least an air bearing surface (ABS), the apparatus comprising:

a near field transducer (NFT) positioned adjacent the ABS of the apparatus, wherein the NFT comprises a plasmonic material; and not greater than about 200 ppm of one or more microalloy dopants; and a microalloy dopant layer comprising one or more of the microalloy dopants, wherein the microalloy dopant layer is positioned directly adjacent the NFT.

11. The apparatus according to claim 10, wherein the microalloy dopant layer has a thickness of not greater than about 50 Å.

12. The apparatus according to claim 10, wherein the plasmonic material comprises gold, and wherein the microalloy dopants are selected from: one or more rare earth elements, one or more alkaline earth metals, one or more alkali metals, or combinations thereof.

13. The apparatus according to claim 12, wherein the microalloy dopant in both the NFT and the microalloy dopant layer is independently selected from: beryllium (Be), calcium (Ca), lithium (Li), magnesium (Mg), strontium (Sr), sodium (Na), potassium (K), cerium (Ce), lanthanum (La), neodymium (Nd), gadolinium (Gd), and combinations thereof.

14. The apparatus according to claim 12, wherein the microalloy dopant layer comprises copper (Cu) and beryllium (Be).

15. The apparatus according to claim 10, wherein the NFT is a peg/disc type NFT, a nanorod type NFT, or a funnel-type NFT.

16. A method of fabricating a device, the method comprising:

forming a near field transducer (NFT), the NFT comprising gold or an alloy thereof;

forming a microalloy dopant layer directly adjacent one surface of the NFT, the microalloy dopant layer comprising one or more rare earth elements, one or more alkaline earth metals, one or more alkali metals, or combinations thereof;

applying energy to at least the microalloy dopant layer thereby allowing at least a portion of the microalloy dopant material to diffuse into the NFT, wherein the portion is not greater than about 200 ppm of one or more microalloy dopants.

17. The method according to claim 16, wherein the microalloy dopant layer has a thickness of not greater than about 50 Å.

18. The method according to claim 16, wherein the step of applying energy is distinct from energy produced when the device is operated.

19. The method according to claim 17, wherein the energy is applied via a furnace, a laser, or an e-beam.

20. The method according to claim 16, wherein the microalloy dopant layer further comprises a non-microalloy dopant material.

21. The apparatus according to claim 2, wherein the microalloy dopant is selected from: beryllium (Be), calcium (Ca), lithium (Li), strontium (Sr), sodium (Na), potassium (K), cerium (Ce), lanthanum (La), neodymium (Nd), gadolinium (Gd), and combinations thereof.

22. The apparatus according to claim 12, wherein the microalloy dopant in both the NFT and the microalloy dopant layer is independently selected from: beryllium (Be), calcium (Ca), lithium (Li), strontium (Sr), sodium (Na), potassium (K), cerium (Ce), lanthanum (La), neodymium (Nd), gadolinium (Gd), and combinations thereof.

* * * * *